(12) United States Patent
Armstrong et al.

(10) Patent No.: US 8,566,579 B2
(45) Date of Patent: Oct. 22, 2013

(54) OBFUSCATED AUTHENTICATION SYSTEMS, DEVICES, AND METHODS

(75) Inventors: Robert C. Armstrong, Dublin, CA (US); Robert L. Hutchinson, Dublin, CA (US)

(73) Assignee: Sandia Corporation, Albuquerque, NM (US)

( * ) Notice: Subject to any disclaimer, the term of this patent is extended or adjusted under 35 U.S.C. 154(b) by 342 days.

(21) Appl. No.: 13/048,503

(22) Filed: Mar. 15, 2011

(65) Prior Publication Data
US 2012/0239926 A1  Sep. 20, 2012

(51) Int. Cl.
*G06F 21/00* (2013.01)
(52) U.S. Cl.
USPC .......................................................... 713/155
(58) Field of Classification Search
None
See application file for complete search history.

(56) References Cited

U.S. PATENT DOCUMENTS

| | | | |
|---|---|---|---|
| 7,454,323 B1* | 11/2008 | Bain | 703/13 |
| 2007/0198851 A1* | 8/2007 | Goto | 713/187 |
| 2009/0217047 A1* | 8/2009 | Akashika et al. | 713/175 |
| 2009/0235090 A1* | 9/2009 | Chang | 713/190 |
| 2010/0293612 A1* | 11/2010 | Potkonjak | 726/20 |
| 2011/0013814 A1* | 1/2011 | Ivanov et al. | 382/124 |
| 2011/0113392 A1* | 5/2011 | Chakraborty et al. | 716/102 |

OTHER PUBLICATIONS

W. Erik Anderson, "On the Secure Obfuscation of Deterministic Finite Automata," Cryptology ePrint Archive, Report 2008/184, Apr. 2008.*

* cited by examiner

*Primary Examiner* — Shaun Gregory
(74) *Attorney, Agent, or Firm* — Timothy P. Evans

(57) ABSTRACT

Embodiments of the present invention are directed toward authentication systems, devices, and methods. Obfuscated executable instructions may encode an authentication procedure and protect an authentication key. The obfuscated executable instructions may require communication with a remote certifying authority for operation. In this manner, security may be controlled by the certifying authority without regard to the security of the electronic device running the obfuscated executable instructions.

20 Claims, 4 Drawing Sheets

OBFUSCATED AUTHENTICATION SYSTEMS, DEVICES, AND METHODS

STATEMENT REGARDING RESEARCH & DEVELOPMENT

Described examples were made with Government support under Government Contract No. DE-AC04-94AL85000 awarded by the U.S. Department of Energy to Sandia Corporation. The Government has certain rights in the invention, including a paid-up license and the right, in limited circumstances, to require the owner of any patent issuing in this invention to license others on reasonable terms.

TECHNICAL FIELD

Embodiments of the invention relate generally to authentication systems and electronic devices implementing authentication. Examples utilize obfuscated software.

BACKGROUND

Increasingly important transactions are being conducted using personal electronic devices. Communications as well as transactions, including banking or other sensitive transactions, may be conducted using personal electronic devices.

Authentication of a user may be required to complete a transaction or to allow access to an electronic device. As known in the art public-key cryptography may be used to encrypt or decrypt communications, or to authenticate a user. Generally, public-key cryptography is a method for secret communication between two parties. It employs a pair of keys, one private, which is held secret, and one public, which is distributed. Messages are encrypted with the recipient's public key and decrypted with the recipient's corresponding private key. Other key-based cryptography systems are also known which involve the use of private and/or public keys for encryption. If one or more of the keys are compromised, or a device containing a key is misused, misplaced, or otherwise compromised, communications or authentication may be compromised. Similarly, if the authentication procedure becomes known, communications or authentication may be compromised.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known electronic components, circuits, control signals, timing protocols, electronic device components, and software operations have not been shown in detail in order to avoid unnecessarily obscuring the described embodiments of the invention.

Figure 1:
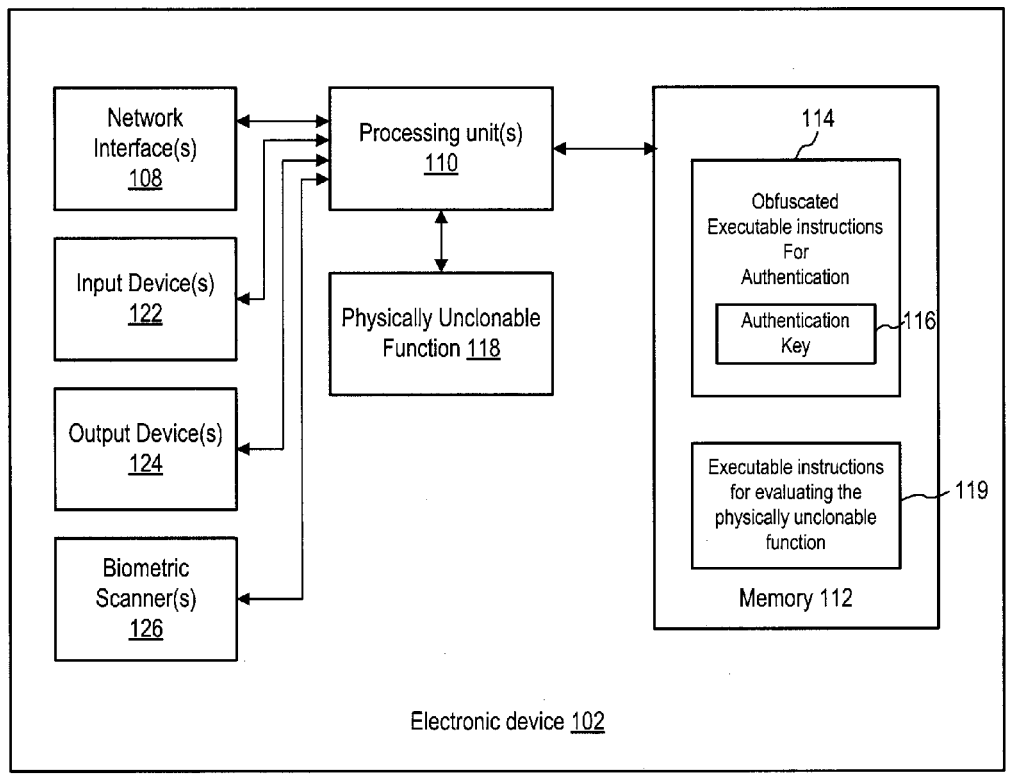
FIG. 1 is a schematic illustration of a system according to an embodiment of the present invention.

FIG. 1 is a schematic illustration of a system according to an embodiment of the present invention. The system 100 includes an electronic device 102 and a certifying authority 104. The electronic device 102 and the certifying authority 104 may communicate over a network (wired or wireless) using respective network interfaces 106 and 108. The electronic device 102 may include one or more processing unit(s) 110 and a memory 112. The memory 112 may store executable instructions that may be executed by one or more of the processing unit(s) 110. The executable instructions may include obfuscated executable instructions for authentication 114, an authentication key 116, executable instructions for evaluating a physically unclonable function 118, or combinations thereof. The electronic device 102 may also include a physically unclonable function 118, which may be in communication with the memory 112 and/or the processing unit(s) 110. The electronic device 102 may also include one or more input device(s) 122, one or more output device(s) 124, one or more biometric sensor(s) 126, or combinations thereof, all or some of which may be coupled to the processing unit(s) 110.

Any of a variety of electronic devices may be implemented as electronic device 102 of FIG. 1. Examples of electronic devices include, but are not limited to, portable electronic devices, cell phones, personal digital assistants, music players, media readers, computers, laptops, and appliances. Generally, any electronic device having sufficient processing power, memory, and communication capabilities to implement example authentication methodologies described herein, may be used in accordance with embodiments of the present invention.

The electronic device 102 includes one or more processing unit(s) 110 and a memory 112. The memory 112 may encode executable instructions and may be coupled to the processing unit(s). The processing unit(s) 110 and the memory 112 may accordingly function cooperatively such that execution of executable instructions encoded on the memory 112 by the processing unit(s) 110 may achieve functionalities by performing transformations described further below. Any suitable memory may be used to implement the memory 112 including, but not limited to, flash memory, solid state memory, or hard disk drive.

Obfuscated executable instructions for authentication 114 may be encoded in the memory 112. The obfuscated executable instructions for authentication 114 include executable instructions for performing authentication procedures. The obfuscated executable instructions for authentication 114 may include instructions for performing any of a variety of authentication procedures, including a key-based authentication procedure using any block cipher. In some examples, the authentication procedure includes a state machine configured for authentication. In some examples, the authentication procedure may be implemented using a Turing machine. One or more authentication keys, such as the authentication key 116 in FIG. 1, may also be encoded in the memory 112. The authentication procedure may be implemented, for example, by a state machine. Accordingly, the obfuscated executable instructions for authentication 114 may describe operations to execute a state machine. While the obfuscated executable instructions for authentication 114 and the authentication key 116 are illustrated as encoded in the same memory 112 in FIG. 1, separate memories may be used.

The obfuscated executable instructions for authentication 114 are obfuscated. Obfuscated executable instructions generally refer to executable instructions which have been transformed such that the instructions may not be readily reverse engineered, or in their function be understood in any way, and the operations dictated by the obfuscated executable instructions may not be determined by an observer. In some examples, the obfuscated executable instructions for authentication 114 require receipt of a signal corresponding to a code or other secret from an oracle. Examples of obfuscation using a secret received from an oracle are described in W. Erik Anderson, "On the Secure Obfuscation of Deterministic Finite Automata," Cryptology ePrint Archive, Report 2008/184, April 2008, which publication is hereby incorporated by reference in its entirety for any purpose. In embodiments of the present invention, the obfuscated executable instructions for authentication 114 may not be successfully executed without receipt of a signal from the certifying authority 104 corresponding to the oracle 105.

In embodiments of the present invention, an authentication key 116 may be protected by the obfuscated executable instructions for authentication 114. For example, the authentication key 116 may be included within the obfuscated executable instructions for authentication 114. In other examples, the authentication key 116 may only be accessed using the obfuscated executable instructions for authentication 114. The authentication key 116 may include, for example, any type of encryption key.

The certifying authority 104 may be implemented using any suitable computing device having processing, storage, and communication capabilities for performing the acts described. The certifying authority 104 may include, for example, one or more severs or other computing devices that may include one or more processing unit(s) and memory encoding executable instructions. The certifying authority 104 may be coupled to, or store, one or more oracles, including the oracle 105 of FIG. 1. The oracle 105 may include a code or other secret required for operation of the obfuscated executable instructions for authentication 114. The oracle 105 may be particular to a specific user, electronic device, or both. The oracle 105 may be implemented using a smart card, and/or one or more processing unit(s) and/or storage. Any number of oracles may be managed by the certifying authority 104. As will be described further below, responsive to a request for the oracle 105, a signal corresponding to the code or other secret stored by the oracle 105 may be communicated to the electronic device 102 over a network using the network interface 106, and may be received at the electronic device 102 using the network interface 108.

Any suitable network may be used, wired or wireless. Examples of networks include, but are not limited to, the Internet, local area networks, and wide area networks. The network interface(s) 108 and 106 may be selected to operate with the particular network used.

The memory 112 may in some embodiments also include a physically unclonable function 118 and/or executable instructions for evaluating a physically unclonable function 119. The executable instructions for evaluating a physically unclonable function 119 may operate in cooperation with one or more processing unit(s) 110 to evaluate the physically unclonable function 118. The physically unclonable function 118 may rely on one or more physical aspects of the electronic device 102 which may be unique to the device 102. The physically unclonable function produces a non-replicatable one-way function that uniquely identifies a particular device. Accordingly, a result of the physically unclonable function may be used to uniquely identify the electronic device 102. As described further below, evaluating the physically unclonable function 118 may be used to ensure the obfuscated executable instructions for authentication 114 are executed only by the electronic device 102 and may not be executed on a different electronic device. Embodiments of the physically unclonable function 118 are one-way cryptographically strong functions that are unique to the device on which the physically unclonable function 118 resides.

Any number of input and output devices 122 and 124 may also be included in the electronic device 102. Examples of input and output devices include, but are not limited to, displays, keyboards, touch screens, microphones, and speakers. Any combination of input and output devices may be used.

In some examples, the electronic device 102 may include or may be in electronic communication with a biometric scanner 126. The biometric scanner 126 may obtain a biometric reading from a user. Biometrics generally refer to data pertaining to a unique measurable feature of a human user. Examples of biometrics include, but are not limited to, fingerprints, handprints, and retinal scans. In some examples, biometrics received from the biometric scanner(s) 126 may be used to authenticate a user in conjunction with the obfuscated executable instructions for authentication 114 and/or the physically unclonable function 118. The biometric may be encrypted such that the biometric may be a one-way cryptographically strong function that is unique to the user.

Accordingly, embodiments of the present invention may employ both a biometric and a physically unclonable function that ties the authorization to a user and a device, respectively. Both the biometric and the physically unclonable function may be a one-way cryptographically strong function unique to the user or device, respectively.

Figure 2:
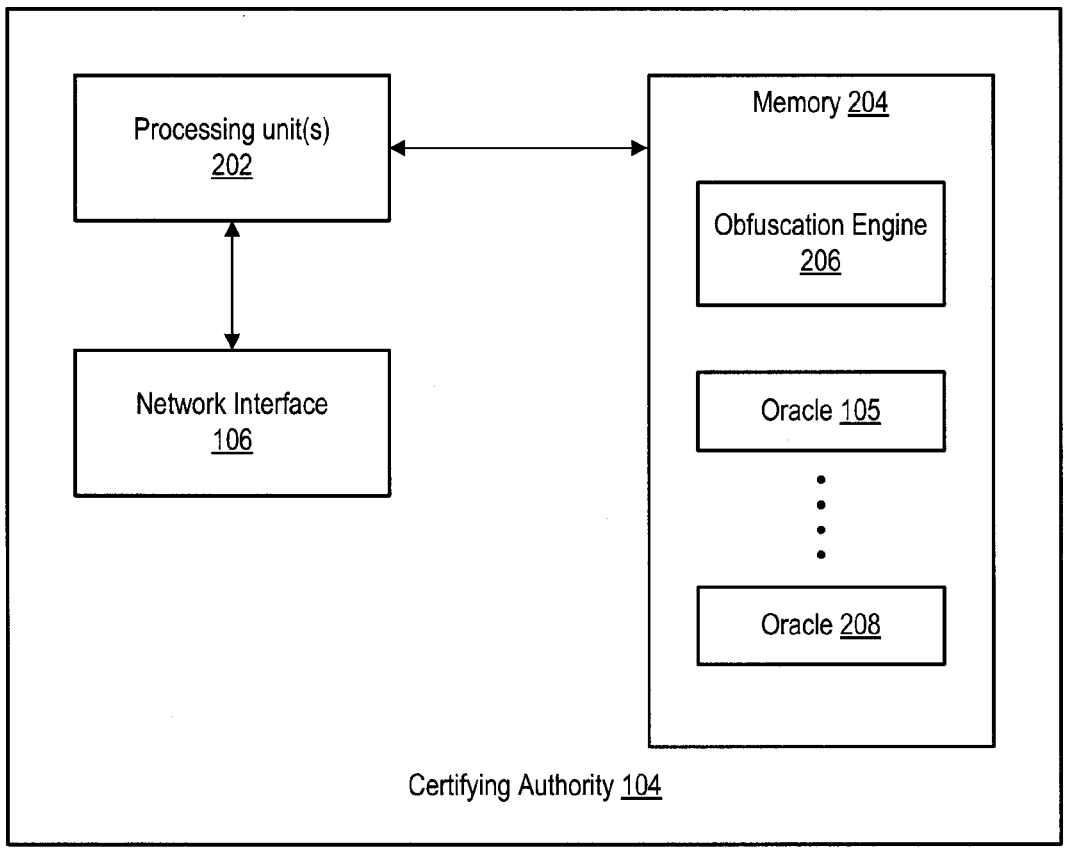
FIG. 2 is a schematic illustration of a certifying authority according to an embodiment of the present invention.

FIG. 2 is a schematic illustration of a certifying authority according to an embodiment of the present invention. The certifying authority 104, which may be the same as the certifying authority 104 shown in FIG. 1, may include a network interface 106 coupled to one or more processing unit(s) 202. A memory 204 may be coupled to the processing unit(s) 202 and may include executable instructions for an obfuscation engine 206. The memory 204 may also encode one or more oracles including oracle 105 and oracle 208 shown in FIG. 2.

The obfuscation engine 206 may be used to generate the oracles 105 and 208. The obfuscation engine 206 may also be used to generate the obfuscated executable instructions for authentication 114 shown in FIG. 1. Although the obfuscation engine 206 and oracles 105 and 208 are shown in the same memory 204 in FIG. 2, separate memories may be used. In other embodiments, the obfuscation engine may not be part of the certifying authority 104, but may be located on a separate processing device. The certifying authority may also include executable instructions and hardware for receiving a request for one or more of the oracles, and responding to that request, as will be described further below.

Figure 3:
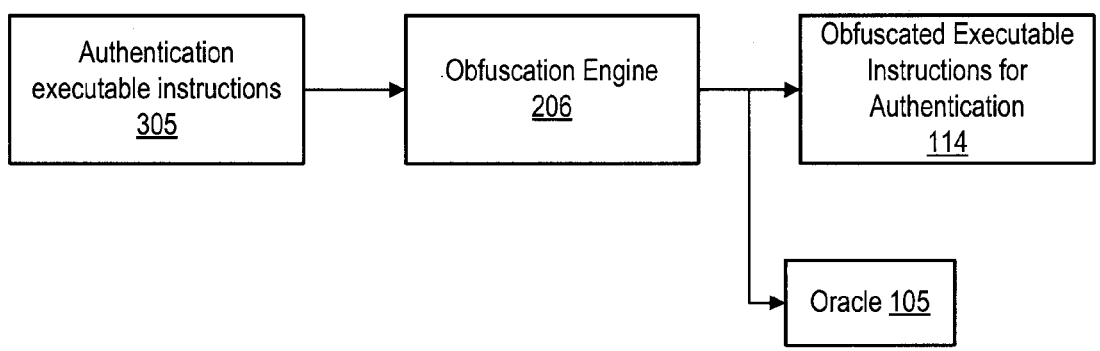
FIG. 3 is a schematic illustration of the generation of obfuscated executable instructions for authentication and oracles according to an embodiment of the present invention.

FIG. 3 is a schematic illustration of the generation of obfuscated executable instructions for authentication and oracles according to an embodiment of the present invention. Executable instructions for authentication 305 may be provided as input to an obfuscation engine, such as the obfuscation engine 206 of FIG. 2. The obfuscation engine 206 may be configured to generate obfuscated executable instructions for authentication 114 and the oracle 105. The obfuscation may be performed such that the oracle 105 is a secret required for operation of the obfuscated executable instructions for authentication.

As has been described above, the obfuscated executable instructions for authentication 114 have been obfuscated by the obfuscation engine 206. Accordingly, the obfuscated executable instructions for authentication 114 may be freely distributed without, or with a relatively low degree of, concern of compromising the authentication procedure encoded by the instructions. The obfuscated executable instructions for authentication 114 may be provided to one or more users for installation on electronic devices. The oracle 105 may be stored at a certifying authority. As will be described further below, authentication can be denied by controlling access to the oracle without modifying the end user's device and without the need to track compromised keys or the like.

Accordingly, systems and electronic devices according to embodiments of the present invention have been described above. Electronic devices may include obfuscated executable instructions for authentication. The obfuscated executable instructions may cooperate with one or more processing units to implement an obfuscated state machine configured to authenticate a user of the portable electronic device. A signal from a certifying authority corresponding to an oracle may be required to execute the obfuscated executable instructions for authentication. In this manner, the obfuscated executable instructions may be distributed with a reduced risk of compromising the authentication procedure and/or one or more encryption keys.

Examples of methods for authentication and/or denial of access will now be described.

Figure 4:
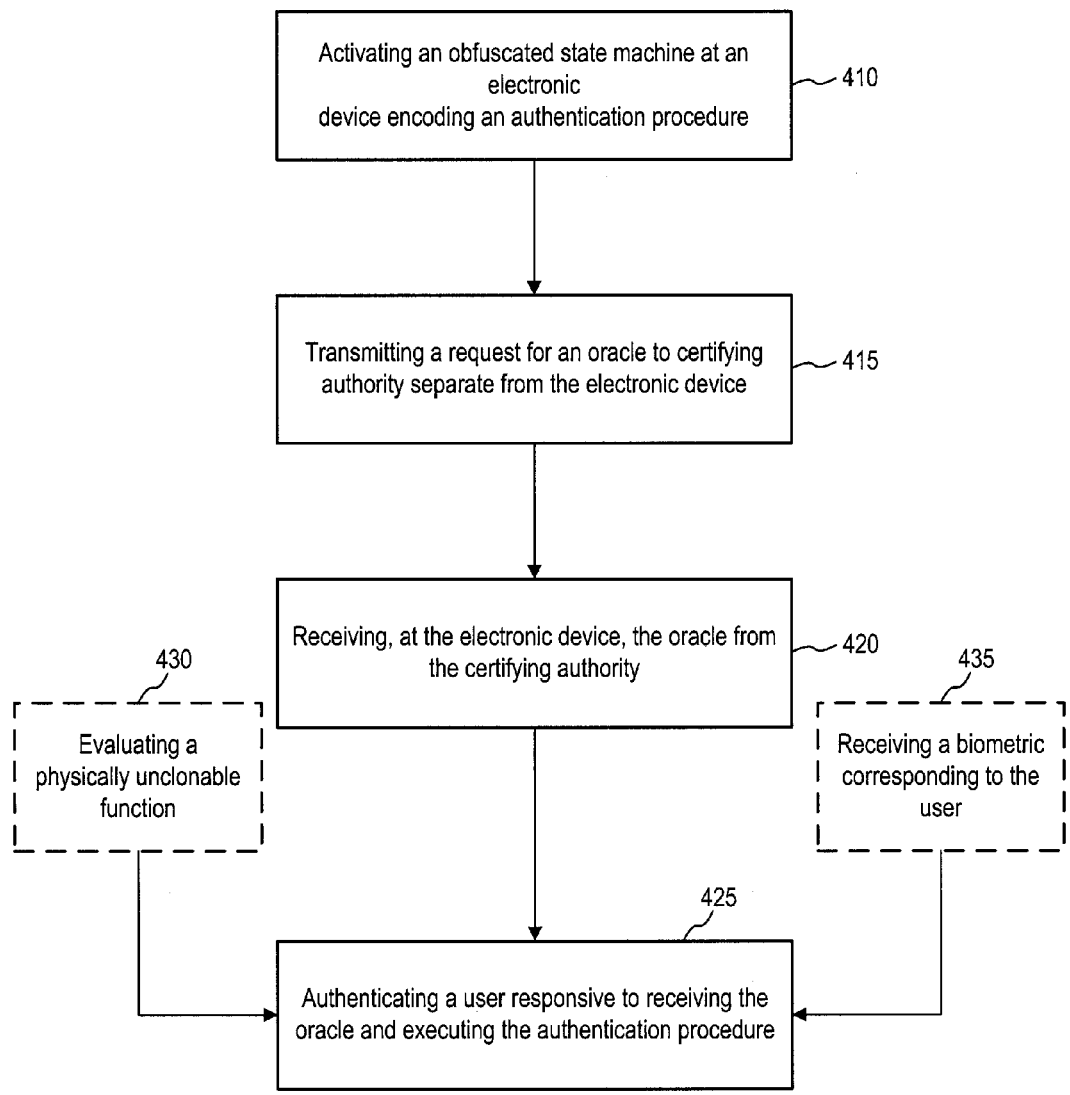
FIG. 4 is a flowchart illustrating an example method for authenticating a user to an electronic device according to embodiments of the present invention.

FIG. 4 is a flowchart illustrating an example method for authenticating a user to an electronic device according to embodiments of the present invention. In block 410, an obfuscated state machine may be activated at an electronic device. The obfuscated state machine may encode an authentication procedure. Block 410 may be followed by block 415. In block 415, a request for an oracle may be transmitted from the electronic device to a certifying authority separate from the electronic device. Block 415 may be followed by block 420. In block 420, the oracle may be received at the electronic device from the certifying authority. Block 420 may be followed by block 425. In block 425, a user may be authenticated responsive to receipt of the oracle and executing the authentication procedure. It is to be understood that the blocks may in some cases occur in a different order or combinations, and some may be optional in some examples. Other actions may occur, for example, in block 430 a physically unclonable function may be evaluated. In block 435, a biometric corresponding to the user may be received. The biometric and/or the evaluation of the physically unclonable function may also be used to authenticate the user.

By user herein is generally meant an entity making use of an electronic device. Examples of a user include, but are not limited to, a human user, other being, or an electronic process making use or trying to make use of the electronic device.

In block 410, an obfuscated state machine encoding an authentication procedure may be activated at an electronic device. An example of the electronic device is the electronic device 102 of FIG. 1 including obfuscated executable instructions for authentication 114. The obfuscated state machine may be activated, for example, by a user request for access to a program or data requiring authentication. The obfuscated state machine may be activated by powering on the device, or may be activated periodically without any particular trigger.

In block 415, a request for an oracle may be transmitted to a certifying authority separate from the electronic device. For example, referring back to FIG. 1, the electronic device 102 may transmit a request for the oracle 105 to the certifying authority 104. The request may generally be transmitted over a network, as has been described above. The oracle requested may be determined or specified by the obfuscated state machine activated in the block 410, and the oracle may be required for operation of the obfuscated state machine. In some examples, without the code or other secret stored by the oracle, the obfuscated state machine may not be able to perform its function, and authentication may fail. Accordingly, the request sent to the certifying authority in block 415 may request a specific oracle required to operate the obfuscated state machine encoding the authentication procedure. In some examples, requests for the oracle may be sent periodically from the electronic device to the certifying authority such that authentication must be established on a periodic basis, such as every 30 seconds or less in some examples.

In block 420, the oracle may be received at the electronic device. This may include, for example, receiving a signal at the electronic device corresponding to a code or a secret encoded by the oracle. The signal may be provided to the processing unit(s) of the electronic device and used to execute the authentication procedure encoded by the obfuscated state machine. In some examples, if the oracle or a signal corresponding to the code or secret encoded by the oracle is not received, the obfuscated state machine may not execute the authentication procedure, and access to requested programs and/or data may be denied. In some examples, the authentication procedure itself may not even, completely execute.

In block 425, a user may be authenticated responsive to receipt of the oracle and execution of the authentication procedure. As has been described above, substantially any authentication procedure may be encoded by the obfuscated state machine, including key-based authentication procedures.

In block 430, a physically unclonable function may be evaluated. The physically unclonable function may be encoded on the electronic device, such as the physically unclonable function 118 encoded by the device 102 of FIG. 1. In some examples, both the secret encoded by the oracle and the evaluated physically unclonable function may be required to successfully authenticate a user.

In block 435, a biometric corresponding to the user may be received. For example, the biometric may be received from the biometric scanner 126 of FIG. 1. In some examples, both the secret encoded by the oracle and the biometric corresponding to the user may be required to successfully authenticate a user. In some examples, the secret encoded by the oracle, the evaluated physically unclonable function, and the biometric corresponding to the user may be required to successfully authenticate the user.

Figure 5:
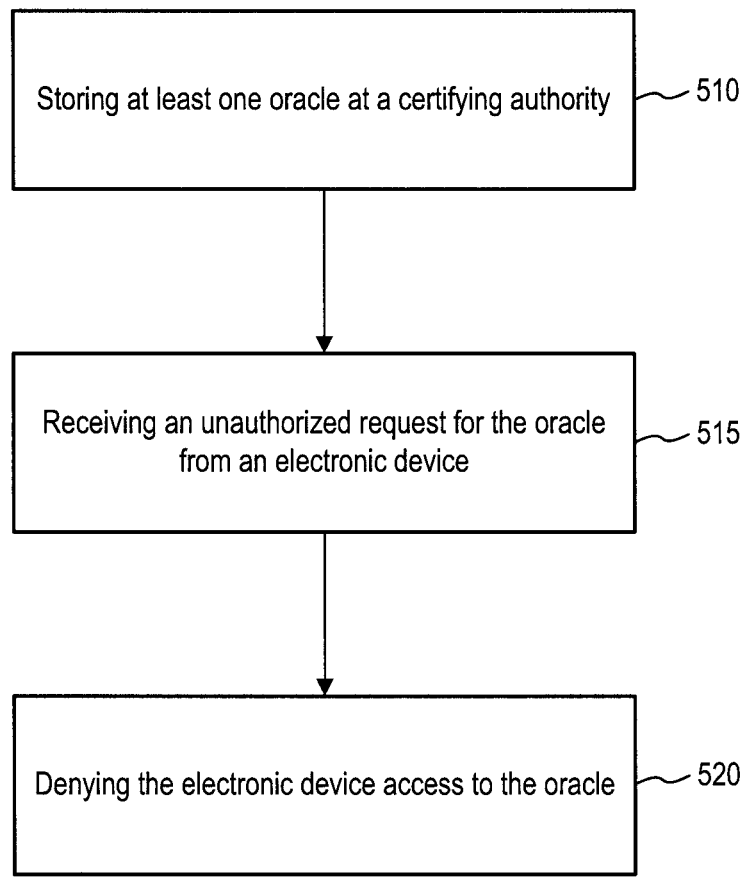
FIG. 5 is a flowchart illustrating an example of denying access according to an embodiment of the present invention.

FIG. 5 is a flowchart illustrating an example of denying access according to an embodiment of the present invention. In block 510, at least one oracle may be stored at a certifying authority. Block 510 may be followed by block 515. In block 515, an unauthorized request for the oracle may be received from an electronic device. Block 515 may be followed by block 520. In block 520, the electronic device may be denied access to the oracle.

In block 510, at least one oracle may be stored at a certifying authority. For example, the oracle 105 may be stored at the certifying authority 104. As described above, any number of oracles may be stored at a single certifying authority. In some examples the oracle may also be generated at the certifying authority, such as by an obfuscation engine at the certifying authority.

In block 515, an unauthorized request for the oracle may be received from an electronic device. The request may be unauthorized in any of a variety of ways. For example, the request may originate from an unauthorized user or an unauthorized electronic device. The request may be unauthorized in that it is a request for an oracle which has been deleted or turned off.

In block 520, access to the oracle may be denied. Access to the oracle may be denied by deleting the oracle, turning the oracle off, or refusing to transmit a signal corresponding to the secret stored by the oracle, for example.

In accordance with the process described in FIG. 5, an ability to execute the authentication procedure encoded by an obfuscated state machine may be contingent on receipt of a signal from a certifying authority. In this manner, access to the authentication procedure and/or encryption keys protected by the obfuscated executable instructions may be controlled by the certifying authority. At the certifying authority, compromised electronic devices may be denied access by deleting or turning off the oracle required to utilize obfuscated instructions on those electronic devices.

Embodiments of authentication systems, devices, and methods described above may provide a variety of advantageous properties. Some advantages will now be described. It is to be understood that embodiments of the invention may not exhibit all, or even any, of these described advantages.

Examples described above include portable electronic devices performing authentication. Authentication procedures and secrets, such as a private key, may be embedded in obfuscated executable instructions. In this manner, secrets stored on the electronic device may be inaccessible, even to intruders having total control over the physical electronic device. Even the procedure by which the secrets authenticate the user may be hidden because it may be a cryptographically hard problem to reverse engineer the authentication procedure from the obfuscated executable instructions. Moreover, the obfuscated authentication procedure may require a received signal from an off-device oracle stored at a certifying authority. In this manner, the authentication procedure may operate at the discretion of the certifying authority. Without the signal from the oracle, the obfuscated executable instructions are nonfunctional and the device may be disabled remotely by denying access to the oracle. Generally, this may allow security to be maintained by a remote certifying authority without regard to the security of the underlying physical platform of individual user devices.

Advantages include enhanced security in some embodiments. Secrets on the electronic device may be protected by cryptographically strong obfuscation encoded directly in the text of the executable instructions, in this manner, the electronic device may be compromised in any number of ways, but the encryption key protected by obfuscated executable instructions remains protected and cannot be deduced from observing function of the obfuscated software code. The output of the authentication procedure also does not reveal the function or the secret because it may itself be cryptographically strong.

Another advantage may be enhanced revocability. Some conventional devices may require a third party to inform an entity seeking authentication that a credential was revoked (often called "blacklists"). In embodiments described above, the credential is not exposed, even on the electronic device on which it is used, and may not be known to the user. Accordingly, the credential itself (such as the encryption key) need not be revoked in some examples, but the corresponding oracle may be removed or deleted.

Another advantage may be increased ease of use. Users may load the described obfuscated executable instructions for authentication on their electronic device and access may be denied by the certifying authority at any time. Users seeking to authenticate need not consult the certifying authority to discover if a particular credential or key is still valid but only to receive the signal from the oracle.

From the foregoing it will be appreciated that, although specific embodiments of the invention have been described herein for purposes of illustration, various modifications may be made without deviating from the spirit and scope of the invention.

What is claimed is:

1. A portable electronic device comprising:
   at least one processing unit;
   a computer readable medium, coupled to the at least one processing unit and encoded with:
   executable instructions, wherein the executable instructions are obfuscated that, when executed by the at least one processing unit, cause the at least one processing unit to implement an obfuscated state machine configured to authenticate a user of the portable electronic device at least in part in response to receiving a signal from a certifying authority separate from the portable electronic device; and
   an authentication key, wherein the authentication key is protected by the obfuscated state machine.

2. The portable electronic device of claim 1 wherein the electronic device further encodes a physically unclonable function, and wherein the obfuscated state machine is further configured to authenticate a user of the portable electronic device at least in part in response to receiving an evaluation of the physically unclonable function.

3. The portable electronic device of claim 1 further comprising an input coupled to the at least one processing unit and configured to receive the signal from the certifying authority.

4. The portable electronic device of claim 1 wherein the signal from the certifying authority corresponds to an oracle stored at the certifying authority, and wherein the oracle and the obfuscated instructions were generated by an obfuscation engine.

5. The portable electronic device of claim 1, further comprising:
   a biometric scanner coupled to the at least one processing unit, wherein the biometric scanner is configured to receive a one-way function unique to a biometric of the user, and wherein the obfuscated state machine is further configured to authenticate a user of the portable electronic device at least in part in response to receiving the signal corresponding to the biometric of the user.

6. The portable electronic device of claim 1, wherein the portable electronic device comprises a cell phone.

7. The portable electronic device of claim 1, wherein the at least one processing unit is configured to receive the signal from the certifying authority over a wireless network.

8. A method for authenticating a user to an electronic device, the method comprising:
   activating an obfuscated state machine encoding an authentication procedure;
   transmitting a request for an oracle to a certifying authority, wherein the certifying authority is separate from the electronic device;
   receiving, at the electronic device, the oracle from the certifying authority; and
   wherein the obfuscated state machine is configured to authenticate the user responsive to receiving the oracle and executing the authentication procedure, wherein the obfuscated state machine is configured to protect an authentication key used during the authentication procedure.

9. The method for authenticating a user of claim 8, further comprising:
   receiving a biometric signal corresponding to the user; and
   wherein the obfuscated state machine is further configured to authenticate the user responsive to receiving the biometric signal corresponding to the user.

10. The method for authenticating a user of claim 8, further comprising:

evaluating a physically unclonable one-way function; and
wherein the obfuscated state machine is further configured to authenticate the user responsive to evaluating the physically unclonable function.

11. The method for authenticating a user of claim 8, wherein the electronic device comprises a cell phone.

12. The method for authenticating a user of claim 8, wherein said receiving, at the electronic device, the oracle from the certifying authority comprises receiving the oracle from the certifying authority over a wireless network.

13. The method for authenticating a user of claim 8, further comprising:

loading the obfuscated state machine into a memory of the electronic device.

14. The method for authenticating a user of claim 8, wherein an access to the authentication key is available only with the obfuscated state machine.

15. A method for denying access to an electronic device, the method comprising:

storing at least one oracle at a certifying authority, wherein the oracle is configured to enable an obfuscated state machine on the electronic device, and wherein the obfuscated state machine is configured to perform an authentication procedure, wherein the obfuscated state machine is configured to protect an authentication key used in the authentication procedure;
receiving, at the certifying authority, an unauthorized request from the electronic device for the at least one oracle; and
denying the oracle to the electronic device.

16. The method for denying access of claim 15, wherein the authentication key includes an encryption key.

17. The method for denying access of claim 15, further comprising:

receiving an indication the electronic device is compromised; and
disabling access to the oracle responsive to the indication the electronic device is compromised.

18. The method for denying access of claim 17, wherein the act of disabling access to the oracle comprises turning the oracle off.

19. The method for denying access of claim 17, wherein the act of disabling access to the oracle comprises deleting the oracle.

20. The method for denying access of claim 15, wherein the obfuscated state machine and the oracle were generated at least in part by an obfuscation engine.

\* \* \* \* \*